(12) United States Patent
Kimura et al.

(10) Patent No.: US 8,486,303 B2
(45) Date of Patent: Jul. 16, 2013

(54) GRANULE MASS

(75) Inventors: Kenji Kimura, Toyonaka (JP); Hitoshi Hara, Oita (JP); Yoshiyuki Endo, Osaka (JP)

(73) Assignee: Sumitomo Chemical Company Limited, Tokyo (JP)

( * ) Notice: Subject to any disclaimer, the term of this patent is extended or adjusted under 35 U.S.C. 154(b) by 1244 days.

(21) Appl. No.: 11/589,904

(22) Filed: Oct. 31, 2006

(65) Prior Publication Data
US 2007/0100045 A1    May 3, 2007

(30) Foreign Application Priority Data

Oct. 31, 2005   (JP) .................................. 2005-315888
Nov. 15, 2005   (JP) .................................. 2005-329754

(51) Int. Cl.
| C09K 15/00 | (2006.01) |
| C08K 5/51 | (2006.01) |
| C08K 5/00 | (2006.01) |
| B29C 33/60 | (2006.01) |
| C08G 65/00 | (2006.01) |
| C08G 59/40 | (2006.01) |

(52) U.S. Cl.
USPC ............ 252/397; 524/136; 524/291; 528/108

(58) Field of Classification Search
USPC .................... 524/136, 291; 528/108; 252/397
See application file for complete search history.

(56) References Cited

U.S. PATENT DOCUMENTS

| 3,502,613 A | 3/1970 | Berger |
| 4,216,137 A | 8/1980 | Wang et al. |
| 5,051,460 A | 9/1991 | Kirsch et al. |
| 5,240,642 A | 8/1993 | Neri et al. |
| 5,286,772 A | 2/1994 | Rapoport |
| 5,597,857 A | 1/1997 | Thibaut et al. |
| 6,491,853 B1 | 12/2002 | Gaa et al. |
| 6,630,436 B1 * | 10/2003 | York et al. ..................... 510/392 |
| 6,787,067 B2 | 9/2004 | Yukino et al. |
| 6,800,228 B1 | 10/2004 | Semen |
| 2001/0044518 A1 | 11/2001 | Hoffmann et al. |
| 2003/0125432 A1 * | 7/2003 | Yukino et al. .................. 524/136 |
| 2007/0129280 A1 * | 6/2007 | Kimura ........................ 510/446 |

FOREIGN PATENT DOCUMENTS

| EP | 0565184 A1 * | 4/1993 |
| EP | 0 565 184 A1 | 10/1993 |
| EP | 0 719 824 | 7/1996 |
| EP | 0 775 728 | 5/1997 |
| GB | 1 442 681 | 7/1976 |
| JP | 2001-172439 | 6/2001 |

OTHER PUBLICATIONS

Meshmicron conversion Fluid Engineering: Mesh to Micron Conversion Chart Fluid Engineering , TM Industrial Supply 2002 http://www.fluideng.com/FE/meshmicron.html.*
Meshmicron conversion Fluid Engineering {http://www.fluideng.com/FE/meshmicron.html}.*
Brabender Lab Extruder Product Ref 2005 # 15052D Dec. 2005 C.W. Brabender Instruments Inc. South Hackensack NJ zip: 07606 www.cwbrabender.com.*
Bigg et al. Ind. Eng. Chem. Fundam. vol. 13 No. 1 1974 pp. 66-71.*
Office Action issued Sep. 26, 2012 in corresponding Taiwanese Application No. 95139690.
Korean Office Action, with English translation, issued Nov. 20, 2012 in corresponding Korean Patent Application No. 2006-0105110.

* cited by examiner

*Primary Examiner* — Patrick Ryan
*Assistant Examiner* — Aaron Greso
(74) *Attorney, Agent, or Firm* — Wenderoth, Lind & Ponack, L.L.P.

(57) ABSTRACT

An object of the present invention is to provide a granule mass containing an antioxidant as a main component, which is excellent in flowability, produces little dust from an additive, and can be prepared by a simple facility when an additive such as an antioxidant is added to a plastic such as polyolefin, and affords a plastic having thermal stability which is hardly ununiformized, and a process for producing the same. There is provided a granule mass comprising a granule containing a phenol-based antioxidant represented by the following formula (1) and a sulfur-based antioxidant represented by the following formula (2), wherein a content of the sulfur-based antioxidant (2) relative to a total of 100 parts by weight of phenol-based antioxidant (1) and the sulfur-based antioxidant (2) is 3 to 70 parts by weight.

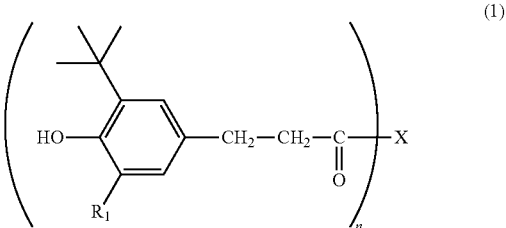

18 Claims, 2 Drawing Sheets

GRANULE MASS

TECHNICAL FIELD

The present invention relates to a granule mass suitable as a plastic additive.

BACKGROUND ART

It is known that, by adding a phenol-based antioxidant to polyolefin such as polyethylene and polypropylene, oxidation deterioration of a molded polyolefin article generated by light or heat is remarkably decreased.

A phenol-based antioxidant is usually a powder having a melting point of around 100° C. and a median diameter of 5 to 70 μm, is added to polyolefin with better flowability through a hopper without being melted, but dust-proof measure was necessary upon addition to polyolefin due to a dust generated from a powder of a phenol-based antioxidant.

Under such the circumstances, a process for preparing a pellet of mixing tetrakis[3-(3,5-di-t-butyl-4-hydroxyphenyl) propionyloxymethyl]methane which is one kind of a phenol-based antioxidant, and an antacid additive such as stearate, heating the mixture to 115° C. to melt a part of the phenol-based antioxidant, and mixing a 2.5 mm pellet-like phenol-based antioxidant and an antacid additive with an extruder is disclosed in JP-A No. 5-179056 (e.g. Example 1). It is disclosed that the pellet is dust-free even when a binder such as paraffin which is not desirable to polyolefin is not used, and there is no disorder upon addition to polyolefin.

However, polyolefin obtained by melting and kneading a pellet obtained by heating a phenol-based antioxidant to 100° C. or higher in advance has a problem that heat stability is uneven, and it has also a problem that the polyolefin must be extrusion-molded using an expensive extruder.

DISCLOSURE OF THE INVENTION

An object of the present invention is to provide a granule mass containing an antioxidant as a main component, which is excellent in flowability, produces little dust from an additive, and can be prepared by a simple facility when an additive such as an antioxidant is added to a plastic such as polyolefin, and affords a plastic having thermal stability which is hardly ununiformized, and a process for producing the same.

That is, the present invention provides the following [1] to [12].

[1] A granule mass comprising a granule containing a phenol-based antioxidant represented by the following formula (1) and a sulfur-based antioxidant represented by the following formula (2), wherein a content of the sulfur-based antioxidant (2) relative to a total of 100 parts by weight of the phenol-based antioxidant (1) and the sulfur-based antioxidant (2) is 3 to 70 parts by weight.

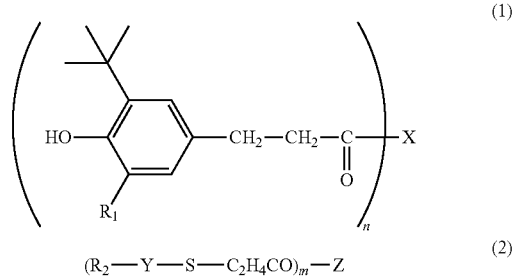

[in the formula (1), $R_1$ represents an alkyl group of a carbon number of 1 to 8, X represents a n-hydric alcohol residue of a carbon number of 1 to 18 optionally containing a heteroatom and/or a cyclic group, and n represents an integer of 1 to 4, in the formula (2), $R_2$ represents an alkyl group of a carbon number of 12 to 18, Y represents a single bond or a —$C_2H_4CO_2$— group, Z represents a m-hydric alcohol residue of a carbon number of 5 to 18, and m represents an integer of 1 to 4]

[2] The granule mass according to [1], wherein a median diameter (based on weight) of a granule contained in the granule mass is 0.1 to 5 mm.

[3] The granule mass according to [1] or [2], wherein a dust flying rate of the granule mass measured by a Heubach test is not more than 1% by weight.

[4] The granule mass according to any one of [1] to [3], wherein the sulfur-based antioxidant represented by the formula (2) is at least one kind selected from the group consisting of 3,3'-thiodipropionic acid di-n-dodecyl ester, 3,3'-thiodipropionic acid di-n-tetradecyl ester and 3,3'-thiodipropionic acid di-n-octadecyl ester.

[5] The granule mass according to any one of [1] to [4], wherein the phenol-based antioxidant represented by the formula (1) is at least one kind selected from the group consisting of 3,9-bis[2-{3-(3-t-butyl-4-hydroxy-5-methylphenyl) propionyloxy}-1,1-dimethylethyl]-2,4,8,10-tetraoxaspiro [5·5]undecane, tetrakis[3-(3,5-di-t-butyl-4-hydroxyphenyl) propionic acid] pentaerythrityl ester and bis{3-(3-t-butyl-4-hydroxy-5-methylphenyl)propionic acid} triethyleneglycolyl ester.

[6] The granule mass according to any one of [1] to [5], which further contains at least one kind additive selected from the additive group consisting of a neutralizing agent, a lubricant, a phosphate antioxidant, a hindered amine-based light stabilizer, an ultraviolet absorbing agent, a metal soap, an antistatic agent, an anti-blocking agent, a pigment, a flame-retardant, a filler, and a phenol-based antioxidant other than the phenol-based antioxidant represented by the formula (1).

[7] A process for producing a granule mass, comprising stirring-granulating a mixture containing a sulfur-based antioxidant represented by the formula (2) and a phenol-based antioxidant represented by the formula (1) in a temperature range of 40 to 70° C., wherein the content of the sulfur-based antioxidant (2) relative to a total of 100 parts by weight of phenol-based antioxidant (1) and the sulfur-based antioxidant (2) is 3 to 70 parts by weight.

[8] The process according to [7], wherein stirring-granulation is performed with a stirring granulator having a stirring wing in the interior of the stirring granulator, and having a clearance between a tip of the stirring wing and a wall surface of the interior of the stirring granulator, of not more than 30 mm.

[9] A plastic composition characterized in that 0.005 to 5 parts by weight of a granule mass as defined in any one of [1] to [6] is incorporated into 100 parts by weight of a plastic.

[10] The composition according to [9], wherein the plastic is a thermoplastic resin.

[11] The composition according to [10], wherein the plastic is polyolefin.

[12] A method of stabilizing a plastic, comprising incorporating 0.005 to 5 parts by weight of a granule mass as defined in any one of [1] to [6] into 100 parts by weight of the plastic.

EXPLANATION OF SYMBOLS

Figure 1:
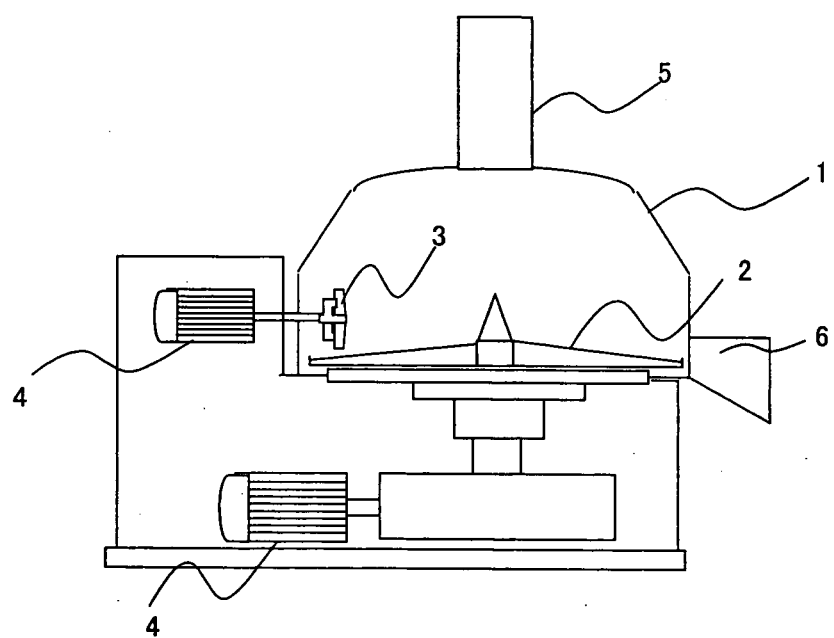
FIG. 1 is a schematic cross-sectional view of a stirring granulator (high speed mixer) used in Examples.

1 Cylinder-type container
2 Stirring wing
3 Chopper
4 Motor
5 Bag filter
6 Granule discharge part
(A) Adaptor part
Position for measuring maximum temperature of mixture at adaptor part
(B) Extrusion port
(C) Heat mixing part
(C1) to (C4) Position for set temperature of heat mixing part
(D) Die part
Position for set temperature of die part
(E) Screw cylinder
(H) Raw material charging part

MODE FOR CARRYING OUT THE INVENTION

The present invention will be described in detail below.

A phenol-based antioxidant used in the present invention is a compound represented by the formula (1).

As $R_1$ in the phenol-based antioxidant (1), a methyl group, a t-butyl group, a t-pentyl group or a t-octyl group is preferable, and a methyl group or a t-butyl group is particularly preferable.

X in the phenol-based antioxidant (1) represents a n-hydric alcohol residue of a carbon number of 1 to 18, and the alcohol residue refers to a group in which a hydrogen atom has left from a hydroxy group of an alcohol.

As X, a triethylene glycol residue, a pentaerythritol residue or a 3,9-bis(1,1-dimethyl-2-hydroxyethyl)-2,4,8,10-tetraoxaspiro[5·5]undecane residue is preferable and, particularly, a pentaerythritol residue or a 3,9-bis(1,1-dimethyl-2-hydroxyethyl)-2,4,8,10-tetraoxaspiro[5·5]undecane residue is preferable. And, n in the phenol-based antioxidant (1) is preferably 2 or 4.

A melting point of the phenol-based antioxidant (1) is usually around 70 to 220° C., preferably 70 to 150° C., further preferably 100 to 130° C.

When a melting point of the phenol-based antioxidant (1) is not higher than 220° C., there is a tendency that dispersity in a plastic is improved and, when the melting point is not lower than 70° C., there is a tendency that adhesion between the antioxidants themselves at storage under a high temperature is suppressed, being preferable.

Examples of the phenol-based antioxidant (1) include 3,9-bis[2-{3-(3-t-butyl-4-hydroxy-5-methylphenyl)propionyloxy}-1,1-dimethylethyl]-2,4,8,10-tetraoxaspiro[5.5]undecane, bis{3-(3-t-butyl-4-hydroxy-5-methylphenyl)propionic acid} triethylene glycolyl ester, and tetrakis{3-(3,5-di-t-butyl-4-hydroxyphenyl)propionic acid} pentaerythrityl ester.

A median diameter based on weight of the phenol-based antioxidant (1) is usually around 1 to 100 μm, preferably around 5 to 70 μm. When a median diameter of the phenol-based antioxidant is not less than 1 μm, there is a tendency that a time for producing a granule is shortened, and a heating temperature is lowered and, on the other hand, when the median diameter is not more than 100 μm, a high fluidity index is exhibited in many cases, even when not granulated.

A fluidity index in the present invention is a Carr's fluidity index, in which four kinds of values of a repose angle, compressibility, a spatula angle, and a uniformity degree or an aggregation degree of a granule mass are measured, each of them is scored using an index having a maximum of 25, which has been empirically obtained in many powders and particles, and the fluidity index is expressed by a total of these indices (maximum 100; minimum 0) [see "Terminology Dictionary For Powder Technology" edited by The Society of Powder Technology, Japan, 2nd edition, Nikkan Kogyo Shinbun, LTD, Mar. 30, 2000, p. 56-p. 57].

A sulfur-based antioxidant used in the present invention is a compound represented by the formula (2).

In the sulfur-based antioxidant (2), $R_2$ is preferably a dodecyl group, a tetradecyl group or an octadecyl group. And, m is preferably 1 or 4.

Z in the sulfur-based antioxidant (2) represents a m-hydric alcohol residue of a carbon number of 5 to 18, and an alcohol residue refers to a group in which a hydrogen atom is left from a hydroxy group of an alcohol.

As Z, a dodecyl alcohol residue, a tetradecyl alcohol residue, an octadecyl alcohol residue or a pentaerythritol residue is preferable.

In particular, when Y in the sulfur-based antioxidant (2) is a single bond, a compound in which $R_2$ is a dodecyl group, m is 4, and Z is a pentaerythritol residue is preferable.

When Y is a —$C_2H_4CO_2$— group, it is preferable that $R_2$ is a dodecyl group, a tetradecyl group or an octadecyl group, m is 1, and Z is an alcohol residue of a carbon number of 12 to 18 corresponding to $R_2$.

Specific examples of the sulfur-based antioxidant which can be used in the present invention include the following compounds:

3,3'-thiodipropionic acid di-n-dodecyl ester,
3,3'-thiodipropionic acid di-n-tetradecyl ester,
3,3'-thiodipropionic acid di-n-octadecyl ester,
tetrakis(3-dodecylthiopropionic acid) pentaerythrityl ester In the granule mass of the present invention, a content of the sulfur-based antioxidant (2) based on a total of 100 parts by weight of the phenol-based antioxidant (1) and the sulfur-based antioxidant (2) is 3 to 70 parts by weight, preferably 8 to 35 parts by weight. When a content of the sulfur-based antioxidant (2) is not less than 3 parts by weight, there is a tendency of shortening in a time for producing a granule, lowering of a heating temperature, and improvement in a fluidity index, being preferable. When the content is not more than 70 parts by weight, there is a tendency that production of a coarse granule is suppressed and this is preferable: When the content is not more than 35 parts by weight, there is a tendency that production of a coarse granule is further suppressed, a size of a granule is easily controlled, and this is particularly preferable.

In the case where the granule mass of the present invention contains an additive described later, when not less than 8 parts by weight of the sulfur-based antioxidant (2) is mixed, a time for producing a granule is shortened, a heating temperature is lowered, and this is particularly preferable.

In addition, in the granule mass of the present invention, a content of the phenol-based antioxidant (1) based on a total of 100 parts by weight of the phenol-based antioxidant (1) and the sulfur-based antioxidant (2) is usually 97 to 30 parts by weight.

In the present invention, it is not meant that the phenol-based antioxidant (1) and the sulfur-based antioxidant (2) are contained in each one granule at the above-mentioned weight ratio, but it is meant that a granule mass meaning all granules is constructed such that it contains the phenol-based antioxidant (1) and the sulfur-based antioxidant (2) at the above-mentioned weight ratio.

The granule mass of the present invention means a granule aggregate of an irregular shape described in JIS-Z 8841 (1993) Item 10, Explanation Table 1, Shape and Name of Granulated Material.

The granule mass of the present invention may further contain at least one additive selected from the following additive group in such the range that granulation property (granulation operability) is not influenced. Usually, a total content of the additives in the granule mass is around 0 to 90% by weight. As the additive, an organic additive or an inorganic additive having a melting point of not lower than 70° C. is preferable from a viewpoint of granulation property.

A median diameter based on weight of an additive used in the present invention is preferably in a range of 0.1 to 100 μm, particularly preferably in a range of 0.5 to 70 μm. When a commercially available additive is used as it is, it is preferable that the additive is adjusted to a preferable median diameter based on weight by the known method in advanced and, thereafter, it is used.

[Additive group: neutralizing agent, lubricant, phosphorus-based antioxidant, hindered amine-based light stabilizer, ultraviolet absorbing agent, filler, metal soap, antistatic agent, anti-blocking agent, pigment, flame-retardant, and phenol-based antioxidant other than the phenol-based antioxidant (1)]

Examples of the additive include the following compounds:
neutralizing agents such as synthetic hydrotalcite, natural hydrotalcite, calcium hydroxide etc.; lubricants such as oleic acid amide, erucic acid amide, polyethylene wax etc.; phosphorus-based antioxidants such as tris(2,4-di-t-butylphenyl) phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-diphenylene diphosphonite, 6-[3-(3-t-butyl-4-hydroxy-5-methylphenyl) propoxy]-2,4,8,10-tetra-t-butyldibenz[d,f][1,3,2]dioxaphosphepine etc.;

hindered amine-based light stabilizers such as bis(2,2,6,6-tetramethyl-4-piperidyl)sebacate, poly[{6-(1,1,3,3-tetramethylbutyl)amino-1,3,5-triazin-2,4-diyl}{(2,2,6,6-tetramethyl-4-piperidyl)imino}-1,6-hexamethylene{(2,2,6, 6-tetramethyl-4-piperidyl)imino}] etc.;

ultraviolet absorbing agent such as 2-(2-hydroxy-5-methylphenyl)benzotriazole, 2-(3-t-butyl-2-hydroxy-5-methylphenyl)-5-chlorobenzotoriazole, 2,4-di-t-butylphenyl 3,5-di-t-butyl-4-hydroxybenzoate etc.;

filler such as calcium carbonate, silicate, glass fiber, talc, kaolin, mica, barium sulfate, carbon black, carbon fiber, zeolite, metal powder, metal oxide etc.; metal soap containing a fatty acid metal salt such as a lithium salt, a magnesium salt, a sodium salt, a calcium salt, a barium salt, an aluminum salt, a zinc salt or an iron salt of stearic acid, a lithium salt, a magnesium salt, a sodium salt, a calcium salt, a barium salt, an aluminum salt, a zinc salt or an iron salt of palmitic acid, a lithium salt, a magnesium salt, a sodium salt, a calcium salt, a barium salt, an aluminum salt, a zinc salt or an iron salt of lauric acid, a calcium salt or a zinc salt of behenic acid, a calcium salt, a magnesium salt or a zinc salt of 12-hydroxystearic acid etc.;

the following antistatic agent;
cationic surfactant of quaternary ammonium salt-type, amphoteric surfactant of betaine-type, anionic surfactant of alkyl phosphate-type, cationic surfactant such as primary amine salt, secondary amine salt, tertiary amine salt, quaternary amine salt and pyridine derivative, anionic surfactant such as sulfated oil, soap, sulfated ester oil, sulfated amide oil, sulfated ester salt of olefin, fatty alcohol sulfate ester salt, alkyl sulfate ester salt, fatty acid ethyl sulfonate salt, alkylnaphthalenesulfonate salt, alkylbenzenesulfonate salt, succinic acid ester sulfonate salt and phosphate ester salt, antistatic agent such as nonionic surfactant such as polyhydric alcohol partial fatty acid ester, fatty alcohol ethylene oxide adduct, fatty acid ethylene oxide adduct, fatty amine or fatty acid amide ethylene oxide adduct, alkylphenol ethylene oxide adduct, polyhydric alcohol partial fatty acid ester ethylene oxide adduct and polyethylene glycol, amphoteric surfactant such as carboxylic acid derivative and imidazoline derivative and, among them, antistatic agent having a melting point exceeding 70° C., inorganic anti-blocking agent such as aluminum silicate, synthetic silica, natural silica, zeolite, kaolin and diatomaceous earth, or organic anti-blocking agent such as cross-linked polymethyl methacrylate;

pigment such as carbon black, titanium oxide, phthalocyanine-based pigment, quinacridone-based pigment, isoindolinone-based pigment, perylene or perynine-based pigment, quinophthalone-based pigment, diketopyrrolopyrrole-based pigment, dioxazine-based pigment, bisazo fused-based pigment and benzimidazolone-based pigment; flame-retardant such as decabromobiphenyl, antimony trioxide, phosphate-based flame-retardant, aluminum hydroxide etc.;

phenol-based antioxidant other than the phenol-based antioxidant (1) such as 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl)benzene, tris(3,5-di-t-butyl 4-hydroxybenzyl)isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis(6-t-butyl-3-methylphenol), 4,4'-thiobis(6-t-butyl-3-methylphenol) etc.

The process of the present invention comprises stirring-granulating a mixture containing a sulfur-based antioxidant represented by the formula (2), and a phenol-based antioxidant represented by the formula (1) in a temperature in a range of 40 to 70° C., wherein the content of the sulfur-based antioxidant (2) relative to a total of 100 parts by weight of phenol-based antioxidant (1) and the sulfur-based antioxidant (2) is 3 to 70 parts by weight.

Specifically, a phenol-based antioxidant (1), a sulfur-based antioxidant (2) and, if necessary, an additive other than (1) and (2) are placed into a stirring granulator, and the mixture is stirred at a temperature of the mixture measured with a thermometer disposed in the interior of the granulator, of 40 to 70° C., preferably 45 to 55° C. When a temperature of the mixture is not lower than 40° C., since there is a tendency that a time for preparing a granule is shortened, this is preferable. When the temperature is not higher than 70° C., since there is a tendency that the antioxidizing ability of a granule is improved, this is preferable.

Examples of a method of heating a stirring granulator include a method of setting utilizing heat production resulting from a shear force when an antioxidant and the like in a stirring granulator are stirred, a method of raising a temperature by passing a heating medium through a jacket or the like of a stirring granulator, and a method of combining of them.

Examples of a method of placing an additive such as an antioxidant into a stirring granulator include a method of placing a phenol-based antioxidant (1), a sulfur-based antioxidant (2) and, if necessary, an additive at once, followed by stirring-granulation, a method of placing a phenol-based antioxidant (1) and, if necessary, an additive at once, stirring the mixture, raising a temperature to a desired temperature, placing a sulfur-based antioxidant (2), and stirring-granulating the mixture, and a method of similarly raising a temperature to a desired temperature while the mixture is stirred, spraying a sulfur-based antioxidant (2) which has been warmed to liquid, and stirring-granulating this.

In the process of the present invention, unlike the previous extrusion molding, mixing and granulating can be performed in one stirring granulator.

Among them, since a method of placing a phenol-based antioxidant (1), a sulfur-based antioxidant (2) and, if necessary, an additive at once, and stirring-granulating the mixture, if necessary, while warming the mixture is simple, it is preferable.

A stirring granulator used in the present invention is an internal stirring-type granulator usually having a stirring wing in the interior thereof, and having a clearance between a tip of a stirring wing and a wall surface in the interior of a stirring granulator of usually not more than 30 mm, preferably around 0.1 to 5 mm (about 1 mm in Examples).

Examples of the stirring granulator include a vertical-type mixer such as a high speed mixer (stirring rolling granulator), a Henschel mixer (high speed stirring granulator), a particle granulator, Pharma-Matrix, a supermixer, a GRAL-Gral, a Schugi mixer, a high speeder, a new speed kneader and the like, and a horizontal-type mixer such as a Lodige mixer, a Spartan granulator, a pin mixer and the like. The stirring granulator may be provided with a stirring wing called chopper which is subjected to grinding and particle size adjustment of a coarse granulated particle, unlike a stirring wing for granulation.

A stirring wing of a high speed mixer used in Examples will be explained in more detail. A cross-section of a stirring wing is inclined from a bottom at an angle of 10 to 50° (in Examples, 30 to 45° for a central part, and 20 to 25° for a tip), and a mixture containing an antioxidant, and a produced granule are scooped up from a bottom.

A shape of a wing end contacting with a wall surface in the interior of a stirring granulator may be conveniently designed. In the case of a high speed mixture used in Examples, there is inclination toward a central part, a mixture is scooped up to a central part, so that a mixture does not reside on a corner between a bottom and a wall surface.

A stirring rate is different depending on a shape of a selected stirring wing, but usually, a wing tip rate is around 2 to 40 m/s, preferably 4 to 20 m/s. When a wing tip rate is not higher than 40 m/s, since there is a tendency that grinding of a produced granule with a stirring wing is suppressed, this is preferable. When the rate is not lower than 2 m/s, since there is a tendency that flowability of the resulting granule is improved, this is preferable.

When mixed with a stirring granulator, from a viewpoint of suppression of deterioration in an antioxidant, it is preferable to mix under the inert gas atmosphere such as nitrogen.

After completion of mixing, from a viewpoint of suppression of deterioration in an antioxidant, it is preferable to cool the mixture lower than a temperature of the interior of the granulator, more preferably at a temperature of about 40° C. to about 0° C. by passing the cold air, or retaining a granule in a refrigerator.

In addition, in order to stabilize quality of the resulting granule, a large granule (for example, 5 mm or more, preferably 3 mm or more) or a small granule (for example, 0.1 mm or less, preferably 0.3 mm or less, more preferably 0.5 mm or less) may be removed with a sieve.

The thus obtained granule mass of the present invention is the aforementioned granule aggregate, and the granule has a median diameter based on weight of 0.1 to 5 mm. And, a granule mass having a dust flying rate in a Heubach test of not more than 1% by weight has a small dust flying amount at handling, and is preferable also from a viewpoint of working environment. Particularly, a granule mass consisting of granules having a median diameter based on weight of 0.1 to 2 mm is better in dispersity upon corporation into a plastic.

The granule mass of the present invention is suitable as a stabilizing agent for a plastic which easily undergoes deterioration due to heat or light.

Examples of the plastic include a thermoplastic resin. As the thermoplastic resin, polyolefin having MI (melt index), when a load 2.16 kg is applied at 230° C., in a range of 0.01 to 100 is preferable. In addition, a plastic having a median diameter based on weight in a range of 0.1 to 10 mm is preferable.

Examples of the plastic includes a polyolefin-based resin (polyethylene, polypropylene, ethylene-vinyl acetate copolymer etc.), a polystyrene-based resin (GP-PS, HI-PS, styrene-butadiene copolymer, acrylonitrile-styrene-butadiene copolymer etc.), a polyamide based resin (6 nylon, 12 nylon etc.), cyclic polyolefin, chlorine-containing polymer (polyvinyl chloride, chlorinated rubber etc.), polyester (polyethylene terephthalate, polybutylene terephthalate etc.), polyurethane, engineering plastic (polyphenylene ether, polycarbonate etc.) and the like.

As a plastic, a thermoplastic resin is preferable and, inter alia, polyolefin is preferable.

These plastics can be stabilized by adding the granule mass of the present invention.

An addition amount of the granule mass is preferably in a range of 0.005 to 5 parts by weight, more preferably in a range of 0.01 to 1 part by weight based on 100 parts by weight of the plastic. When the amount is not less than 0.005 part by weight, since there is a tendency that heat stability of a plastic is improved, this is preferable. When the amount is not more than 5 parts by weight, since there is a tendency that properties possessed by a plastic are not deteriorated, and bleeding of an additive is reduced, this is preferable.

Examples of a method of incorporating the granule mass of the present invention into a plastic include a method of mixing the granule mass and a plastic, and melting and kneading the mixture with an extruder, a method of feeding a solution obtained by dissolving or suspending a granule mass in a solvent in advance, to a solution after polymerization of a plastic and, thereafter, removing the solvent by a method such as evaporation, distillation and the like.

The thus stabilized plastic can be processed, for example, into a product such as a film, a molded material and a pipe by the known method.

The granule mass of the present invention produces little dust, and is excellent in flowability, and a plastic obtained by melting and kneading the granule mass of the present invention is excellent in heat stability and the heat stability is scarcely varied. In addition, according to the process for producing the granule mass of the present invention, it is possible to produce a granule mass with simple facilities.

EXAMPLES

The present invention will be described in more detail based on Examples, but it is needless to say that the present invention is not limited by these Examples.

Stirring Granulator

In Examples, a high speed mixer was used in which a stirring wing 2 of three blades having a rotation axis was provided on a bottom of a vertical-type upwardly narrowed cylindrical-type container 1, and a chopper 3 was disposed from a side wall in a horizontal direction. A raw material such as antioxidant was placed therein through a charging inlet (not shown) disposed on an upper part of a container 1. In addition, nitrogen was supplied to a container 1 from a line (not shown) to prevent deterioration of an antioxidant, and a bag filter 5 was disposed so that a raw material was not discharged from a container 1. A cooled granule was taken out through a granule discharging part 6.

Determination of Median Diameter

A median diameter based on weight was measured using a fully automatical sound-type sieving robot sifter RPS-85c manufactured by Seishin Enterprise Co. LTD.

Dust Flying Rate

A dust flying rate was measured using a dustmeter type I manufactured by Dr. Hans Heubach GmbH & Co. KG. As a measuring method, a test material was placed into a dust forming unit having a diameter of 277.2 mm and a volume of 2.2 L, the unit was rotated at 36 rpm, the air was passed at an airflow quantity of 15 L/min and, when an airflow quantity reached 500 L, an amount of fine powders produced on a filter was measured, and weight % relative to a test material used was obtained.

Fluidity Index

A fluidity index was determined by measuring a bulk density, a repose angle, a spatula angle and a uniformity degree using a powder tester manufactured by Hosokawa Micron (see Chemical Technology Handbook, revision 5, p. 254).

Raw materials used in the following Examples, Comparative Examples, Reference Examples are shown in the following Tables 1 to 3.

TABLE 1

| | Phenol-based antioxidant | Melting point (° C.) | Median diameter |
|---|---|---|---|
| (1-1) | 3,9-Bis[2-{3-(3-tert-butyl-4-hydroxy-5-methylphenyl)propionyloxy}-1,1-dimethylethyl]-2,4,8,10-tetraoxaspiro[5•5]undecane | 110~120 | 30 μm |

TABLE 1-continued

| | Phenol-based antioxidant | Melting point (° C.) | Median diameter |
|---|---|---|---|
| (1-2) | Tetrakis{3-(3,5-di-t-butyl-4-hydroxyphenyl)propionic acid} pentaerythrityl ester | 113~116 | 25 μm |

TABLE 2

| | Sulfur-based antioxidant |
|---|---|
| (2-1) | 3,3'-Thiodipropionic acid di-n-tetradecyl ester |
| (2-2) | 3,3'-Thiodipropionic acid di-n-octadecyl ester |

TABLE 3

| | Other additive | Melting point (° C.) |
|---|---|---|
| (3) | Tris(2,4-di-t-butylphenyl) phosphite | 183~187 |
| (4) | Calcium stearate | 150~158 |

Example 1: Production of Granule Mass a

Into a high speed mixer (manufactured by Fukae Powtec Co. LTD.; volume 10 L) were placed 751 g of a phenol-based antioxidant (1-1) and 751 g of a sulfur-based antioxidant (2-1). After placement, the materials were mixed for 3 minutes at a rotation number of a stirring wing of 240 rpm and a rotation number of a chopper blade of 2000 rpm. Thereafter, when the mixer was operated by increasing a rotation number of a stirring wing to 400 rpm, a temperature of the mixture was raised to 45° C. after 12 minutes. At this point, stirring was stopped, and the mixture was cooled to room temperature. The title additive granule mass a for a plastic was obtained at an amount of 1.5 kg.

Examples 2 to 6: Production of Granule Masses b to f

According to the same procedure as that of Example 1 except that a raw material corresponding to each of Examples 2 to 6 described in Table 4 was used in place of raw material antioxidants (1-1) and (2-1) used in Examples 1, granule masses b to f were produced. A granulation temperature is also described in Table 4.

TABLE 4

| | Granule mass | Phenol-based antioxidant | | | Sulfur-based antioxidant | | | Other additive | | | Granulation temperature [° C.] |
|---|---|---|---|---|---|---|---|---|---|---|---|
| | | (1-1), [g] | (1-2), [g] | Content (%) | (2-1), [g] | (2-2), [g] | Content (%) | (3), [g] | (4), [g] | Content (%) | |
| Example 1 | a | 751 | — | 50 | 751 | — | 50 | — | — | — | 45 |
| Example 2 | b | 1400 | — | 92 | 130 | — | 8 | — | — | — | 52 |
| Example 3 | c | 1430 | — | 95 | 72 | — | 5 | — | — | — | 46 |
| Example 4 | d | 214 | — | 14 | 429 | — | 29 | 429 | 429 | 57 | 46 |
| Example 5 | e | — | 214 | 14 | 429 | — | 29 | 429 | 429 | 57 | 45 |
| Example 6 | f | 1200 | — | 80 | — | 301 | 20 | — | — | — | 62 |
| Comparative Example 1 | g | 1500 | — | 100 | — | — | 0 | — | — | — | Granulation impossible |
| Comparative Example 2 | a' | 1000 | — | 50 | 1000 | — | 50 | — | — | — | 47 |

A content indicates a weight ratio of a phenol-based antioxidant, a sulfur-based antioxidant, or other additive letting a whole granule mass to be 100%.

Comparative Example 1: Production of Additive Mixture g

According to the same procedure as that of Example 1 except that a raw material described in Comparative Example 1 in Table 4 was mixed at a weight described in Table 4 in place of the raw material used in Example 1, granulation was tried, but an additive mixture g (powdery) was obtained without being granulated.

Comparative Example 2: Production of Additive Cylindrical Pellet Mass a'

Into a 10 L Henschel mixer were placed 1000 g of a phenol-based antioxidant (1-1) and 1000 g of a sulfur-based antioxidant (2-1), and the materials were mixed for 30 seconds at a rotation number of a stirring wing of 2400 rpm to obtain a mixture. The mixture was placed into a 30 mm$\phi$ biaxial extruder (manufactured by Nakatani Machine Co. LTD.) through a hopper (H) described in FIG. 2. As operation condition, C1 is 35° C., C2 is 40° C., C3 is 40° C., C4 is 40° C., A is 47° C., D is 47° C., and a rotation number of a screw is 40 rpm. When extrusion granulation was performed under the above condition, a strand-like composition having a diameter of 4 mm$\phi$ was obtained. This composition was cut into a length of about 5 mm using a cutter, to obtain an additive cylindrical pellet mass a'.

Figure 2:
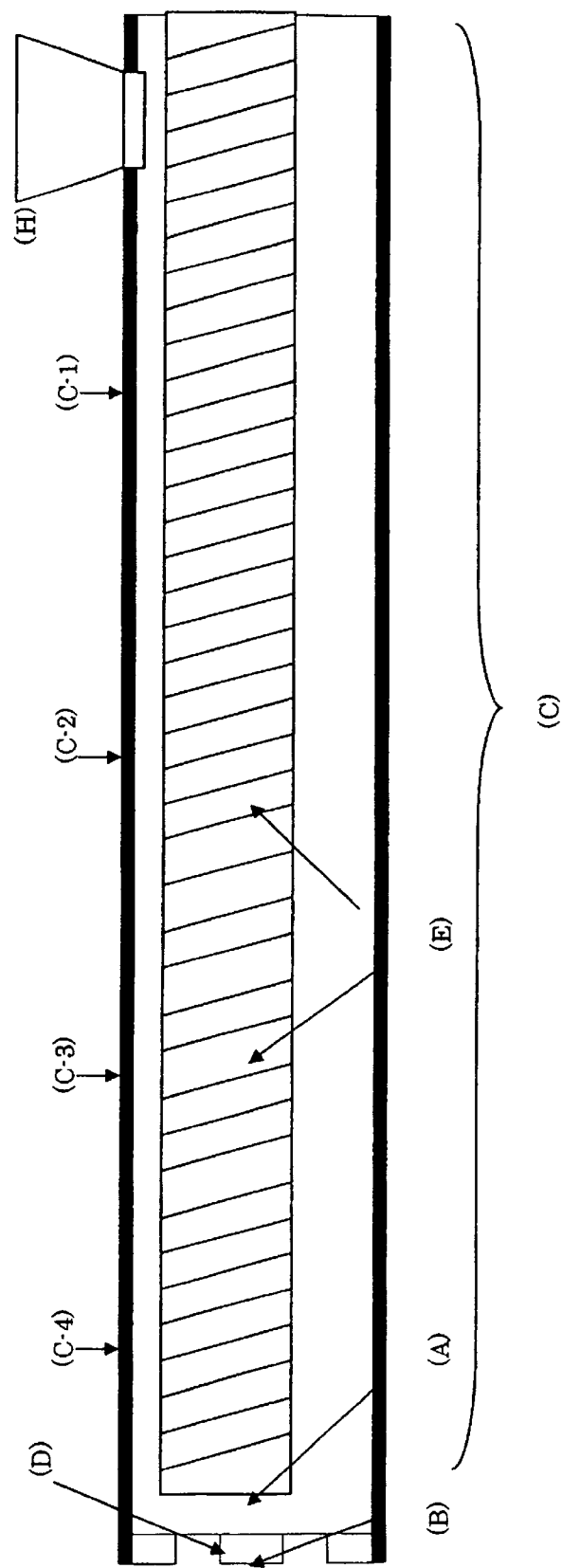
FIG. 2 is an outline view of an extruder used in Comparative Example 2.

C1 to C4 indicate a set heating temperature of a heat mixing part (cylinder part) of an extruder shown in FIG. 2. D indicates a set heating temperature of a die part of an extruder shown in FIG. 2.

Example 7: Measurement of Physical Properties of Granule Masses a to f, Mixture g and Cylindrical Pellet Mass a'

A median diameter based on weight, and a dust flying rate in a Heubach test of granule masses, a mixture and a cylindrical pellet mass a to g and a' produced in Examples 1 to 6, Comparative Example 1 and Reference Example 1 were measured, and results are described in Table 5.

Since as a dust flying rate is smaller, dust flying at handling is reduced, this means that working environment was improved.

Therefore, granule masses a to f of the present invention have a small dust flying rate, and working environment is improved.

TABLE 5

| | Granule mass | Median diameter DP50 (mm) | Dust flying rate (%) | Fluidity index (%) |
|---|---|---|---|---|
| Example 1 | a | 3.0 | 0.6 | 68 |
| Example 2 | b | 0.19 | 1.0 | 72 |

TABLE 5-continued

| | Granule mass | Median diameter DP50 (mm) | Dust flying rate (%) | Fluidity index (%) |
|---|---|---|---|---|
| Example 3 | c | 0.16 | 0.1 | Better flowability |
| Example 4 | d | 0.51 | 0.8 | 82 |
| Example 5 | e | 0.42 | 0.2 | 81 |
| Example 6 | f | 0.49 | 0.8 | 78 |
| Comparative Example 1 | g | <0.1 | >1.0 | Not measured |
| Comparative Example 2 | a' | >2 | <0.1 | Better flowability |

Example 8: Assessment of Performance of Granule Masses a to f, Mixture g, and Cylindrical Pellet Mass a'

Dispersity in polypropylene of granule masses a to f, mixture g and cylindrical pellet mass a' produced in Examples 1 to 6, and Comparative Examples 1 and 2 was measured.

In addition, heat stability of a polypropylene composition with each of granule masses a to f, mixture g, and cylindrical pellet mass a' incorporated therein was measured.

Preparation of Pellet for Assessment

Polypropylene (1.4 kg) [MI=3 (230° C., 2.16 kg·f)], 0.7 g of calcium stearate and 1.05 g of an additive granule mass (a) for a plastic were dry-blended. The resulting mixture was placed into a 30 mm$\phi$ monoaxial extruder (manufactured by Tanabe Plastic Machinery Co. LTD.) through a hopper. Then, the extruder was operated under the condition of an extrusion temperature of 220° C. and a rotation number of a screw of 50 rpm. Detailed operating conditions are described below.

Let a polypropylene pellet obtained until 5 to 10 minutes after placement into the extruder through a hopper represents PP-1, a pellet obtained until 10 to 15 minutes represent PP-2 and, similarly, let a pellet obtained until 15 to 20 minutes represent PP-3 and a pellet obtained until 20 to 25 minutes represent PP-4.

Retention MI values of pellets PP-1 to PP-4 were measured under the following condition.

Five gram of PP-1 was placed into a cylinder of a MI meter at a cylinder temperature of 280° C., then this was made to reside for 20 minutes in the state where a piston was set, a load 2.16 kg was applied and a retention MI value at 280° C. was measured. Similarly, retention MI values of PP-2 to PP-4 at 280° C. were measured. And results of measurements are described in Table 6.

According to the same manner except that a granule mass a was changed to b to f, g and a' regarding granule masses b to f, mixture g and cylindrical pellet a', a pellet was prepared, a retention MI value was measured and results are described in the following Table 6.

As a retention MI value is smaller, heat stability is excellent. In addition, as unevenness (standard deviation) of a retention MI value between PP-1 to PP-4 is smaller, dispersity in polypropylene is better, and this means a polypropylene composition having uniform heat stability.

Therefore, it is seen that granule masses a to f of the present invention are better in dispersity in polypropylene and are excellent in the heat stability effect on polypropylene. Further, it is seen that a polypropylene composition with each of granule masses a to f of the present invention incorporated therein is relatively uniform and is also excellent in heat stability.

TABLE 6

|  | Granule mass | Addition amount* | Retention MI value (g/10 min) | | | | | |
|---|---|---|---|---|---|---|---|---|
|  |  |  | PP-1 | PP-2 | PP-3 | PP-4 | Average | Standard deviation |
| Example 1 | a | 0.075 | 18.9 | 18.2 | 19.3 | 20.4 | 19.2 | 0.9 |
| Example 2 | b | 0.075 | 16.5 | 18.3 | 16.4 | 18.7 | 17.5 | 1.2 |
| Example 3 | c | 0.075 | 19.6 | 18.3 | 18.4 | 18.6 | 18.7 | 0.6 |
| Example 4 | d | 0.3 | 11.6 | 13.4 | 14.3 | 15.3 | 13.6 | 1.6 |
| Example 5 | e | 0.3 | 16.8 | 13.4 | 13.5 | 14.0 | 14.4 | 1.6 |
| Example 6 | f | 0.075 | 16.5 | 18.7 | 18.8 | 22.3 | 19.1 | 2.4 |
| Comparative Example 1 | g | 0.075 | 17.3 | 16.8 | 17.9 | 17.9 | 17.5 | 0.5 |
| Comparative Example 2 | a' | 0.075 | 27.3 | 33.0 | 22.6 | 28.0 | 28.3 | 5.3 |

*An addition amount of each additive indicates the number of weight part per 100 parts by weight of polypropylene.

INDUSTRIAL APPLICABILITY

Since the granule mass of the present invention produces little dust, is excellent in flowability and is better in dispersity in a plastic such as polyolefin and the like, it becomes possible to produce a polyolefin resin composition excellent in heat stability.

What is claimed is:

1. A process for producing a granule mass, comprising stirring-granulating a mixture containing a sulfur-based antioxidant represented by the following formula (2) and a phenol-based antioxidant represented by the following formula (1) in a temperature range of 40 to 70° C.,
    wherein the content of the sulfur-based antioxidant (2) relative to a total of 100 parts by weight of the phenol-based antioxidant (1) and the sulfur-based antioxidant (2) is 8 to 35 parts by weight,
    wherein a dust flying rate of the granule mass measured by a Heubach test is not more than 1% by weight, and
    wherein a fluidity index of the granule mass determined by measuring a bulk density, a response angle, a spatula angle and a uniformity degree using a powder tester is not less than 72%

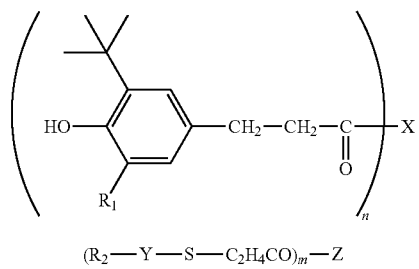

(2) $(R_2—Y—S—C_2H_4CO)_m—Z$ wherein $R_1$ represents an alkyl group of a carbon number of 1 to 8, X represents a n-hydric alcohol residue of a carbon number of 1 to 18 optionally containing a heteroatom and/or a cyclic group, n represents an integer of 1 to 4, $R_2$ represents an alkyl group of a carbon number of 12 to 18, Y represents a single bond or a —$C_2H_4CO_2$—group, Z represents a m-hydric alcohol residue of a carbon number of 5 to 18, and m represents an integer of 1 to 4.

2. The process according to claim 1, wherein a median diameter of the granule is 0.1 to 5 mm.

3. The process according to claim 1, wherein the sulfur-based antioxidant represented by the formula (2) is at least one kind selected from the group consisting of 3,3'-thiodipropionic acid di-n-dodecyl ester, 3,3'-thiodipropionic acid di-n-tetradecyl ester and 3,3'-thiodipropionic acid di-n-octadecyl ester.

4. The process according to claim 1, wherein the phenol-based antioxidant represented by the formula (1) is at least one kind selected from the group consisting of 3,9-bis[2-{3-(3-t-butyl-4-hydroxy-5-methylphenyl)propionyloxy}-1,1-dimethylethyl]-2,4,8,10-tetraoxaspiro[5.5]undecane, tetrakis[3-(3,5-di-t-butyl-4-hydroxyphenyl)propionic acid] pentaerythrityl ester and bis {3-(3-t-butyl-4-hydroxy-5-methylphenyl)propionic acid} triethylene glycolyl ester.

5. The process according to claim 1, wherein the granule mass further contains at least one kind of additive selected from the group consisting of a neutralizing agent, a lubricant, a phosphorus-based antioxidant, a hindered amine-based light stabilizer, an ultraviolet absorbing agent, a metal soap, an antistatic agent, an anti-blocking agent, a pigment, a flame-retardant, a filler, and a phenol-based antioxidant other than the phenol-based antioxidant represented by the formula (1).

6. The process according to claim 1, wherein stirring-granulation is performed with a stirring granulator having a stirring wing in the interior of the stirring granulator, and having a clearance between a tip of the stirring wing and a wall surface of the interior of the stirring granulator, of not more than 30 mm.

7. A plastic composition comprising 0.005 to 5 parts by weight of a granule mass incorporated into 100 parts by weight of a plastic,
    wherein the granule mass comprises a granule containing a phenol-based antioxidant represented by the following formula (1) and a sulfur-based antioxidant represented by the following formula (2),
    wherein a content of the sulfur-based antioxidant (2) relative to a total of 100 parts by weight of the phenol-based antioxidant (1) and the sulfur-based antioxidant (2) is 8 to 35 parts by weight,

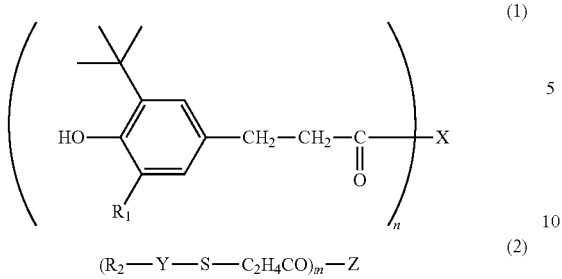

(2) $(R_2-Y-S-C_2H_4CO)_m-Z$ wherein $R_1$ represents an alkyl group of a carbon number of 1 to 8, X represents a n-hydric alcohol residue of a carbon number of 1 to 18 optionally containing a heteroatom and/or a cyclic group, n represents an integer of 1 to 4, $R_2$ represents an alkyl group of a carbon number of 12 to 18, Y represents a single bond or a $-C_2H_4CO_2-$ group, Z represents a m-hydric alcohol residue of a carbon number of 5 to 18, and m represents an integer of 1 to 4, wherein a dust flying rate of the granule mass measured by a Heubach test is not more than 1% by weight, and wherein a fluidity index of the granule mass determined by measuring a bulk density, a response angle, a spatula angle and a uniformity degree using a powder tester is not less than 72%.

8. The composition according to claim 7, wherein the plastic is a thermoplastic resin.

9. The composition according to claim 8, wherein the thermoplastic resin is a polyolefin.

10. A method of stabilizing a plastic, comprising incorporating 0.005 to 5 parts by weight of a granule mass into 100 parts by weight of the plastic, wherein the granule mass comprises a granule containing a phenol-based antioxidant represented by the following formula (1) and a sulfur-based antioxidant represented by the following formula (2), wherein a content of the sulfur-based antioxidant (2) relative to a total of 100 parts by weight of the phenol-based antioxidant (1) and the sulfur-based antioxidant (2) is 8 to 35 parts by weight,

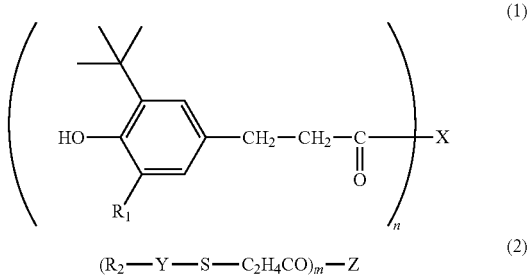

(2) $(R_2-Y-S-C_2H_4CO)_m-Z$ wherein $R_1$ represents an alkyl group of a carbon number of 1 to 8, X represents a n-hydric alcohol residue of a carbon number of 1 to 18 optionally containing a heteroatom and/or a cyclic group, n represents an integer of 1 to 4, $R_2$ represents an alkyl group of a carbon number of 12 to 18, Y represents a single bond or a $-C_2H_4CO_2-$ group, Z represents a m-hydric alcohol residue of a carbon number of 5 to 18, and m represents an integer of 1 to 4, wherein a dust flying rate of the granule mass measured by a Heubach test is not more than 1% by weight, and wherein a fluidity index of the granule mass determined by measuring a bulk density, a response angle, a spatula angle and a uniformity degree using a powder tester is not less than 72%.

11. The plastic composition according to claim 7, wherein a median diameter of the granule is 0.1 to 5 mm.

12. The plastic composition according to claim 7, wherein the sulfur-based antioxidant represented by the formula (2) is at least one kind selected from the group consisting of 3,3'-thiodipropionic acid di-n-dodecyl ester, 3,3'-thiodipropionic acid di-n-tetradecyl ester and 3,3'-thiodipropionic acid di-n-octadecyl ester.

13. The plastic composition according to claim 7, wherein the phenol-based antioxidant represented by the formula (1) is at least one kind selected from the group consisting of 3,9-bis[2-{3-(3-t-butyl-4-hydroxy-5-methylphenyl)propionyloxy}-1,1-dimethylethyl]-2,4,8,10-tetraoxaspiro[5.5]undecane, tetrakis[3-(3,5-di-t-butyl-4-hydroxyphenyl)propionic acid]pentaerythrityl ester and bis{3-(3-t-butyl-4-hydroxy-5-methylphenyl)propionic acid} triethylene glycolyl ester.

14. The plastic composition according to claim 7, wherein the granule mass further contains at least one kind of additive selected from the group consisting of a neutralizing agent, a lubricant, a phosphorus-based antioxidant, a hindered amine-based light stabilizer, an ultraviolet absorbing agent, a metal soap, an antistatic agent, an anti-blocking agent, a pigment, a flame-retardant, a filler, and a phenol-based antioxidant other than the phenol-based antioxidant represented by the formula (1).

15. The method according to claim 10, wherein a median diameter of the granule is 0.1 to 5 mm.

16. The method according to claim 10, wherein the sulfur-based antioxidant represented by the formula (2) is at least one kind selected from the group consisting of 3,3'-thiodipropionic acid di-n-dodecyl ester, 3,3'-thiodipropionic acid di-n-tetradecyl ester and 3,3'-thiodipropionic acid di-n-octadecyl ester.

17. The method according to claim 10, wherein the phenol-based antioxidant represented by the formula (1) is at least one kind selected from the group consisting of 3,9-bis[2-{3-(3-t-butyl-4-hydroxy-5-methylphenyl)propionyloxy}-1,1-dimethylethyl]-2,4,8,10-tetraoxaspiro [5.5]undecane, tetrakis[3-(3,5-di-t-butyl-4-hydroxyphenyl)propionic acid] pentaerythrityl ester and bis{3-(3-t-butyl-4-hydroxy-5-methylphenyl)propionic acid} triethylene glycolyl ester.

18. The method according to claim 10, wherein the granule mass further contains at least one kind of additive selected from the group of consisting of a neutralizing agent, a lubricant, a phosphorus-based antioxidant, a hindered amine-based light stabilizer, an ultraviolet absorbing agent, a metal soap, an antistatic agent, an anti-blocking agent, a pigment, a flame-retardant, a filler, and a phenol-based antioxidant other than the phenol-based antioxidant represented by the formula (1).

* * * * *